United States Patent
Choi et al.

(10) Patent No.: US 8,631,459 B2
(45) Date of Patent: *Jan. 14, 2014

(54) POLICY AND COMPLIANCE MANAGEMENT FOR USER PROVISIONING SYSTEMS

(75) Inventors: Christopher Young-Soo Choi, Southport (AU); Neil Ian Readshaw, Parkwood (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/366,858

(22) Filed: Feb. 6, 2012

(65) Prior Publication Data

US 2013/0205359 A1 Aug. 8, 2013

(51) Int. Cl.
*G06F 21/00* (2013.01)

(52) U.S. Cl.
USPC ............ 726/1; 726/2; 726/4; 726/8; 726/25; 709/217; 709/219; 709/223

(58) Field of Classification Search
USPC ............ 726/1, 2, 4, 8, 25; 709/217, 219, 223
See application file for complete search history.

(56) References Cited

U.S. PATENT DOCUMENTS

| | | | |
|---|---|---|---|
| 6,985,955 B2 | 1/2006 | Gullotta et al. | |
| 2003/0126464 A1* | 7/2003 | McDaniel et al. | 713/201 |
| 2007/0073699 A1* | 3/2007 | Reed | 707/9 |
| 2007/0233531 A1 | 10/2007 | McMahon et al. | |
| 2009/0076865 A1* | 3/2009 | Rousselle et al. | 705/7 |
| 2009/0144802 A1 | 6/2009 | Tillery et al. | |
| 2009/0150981 A1 | 6/2009 | Amies et al. | |
| 2011/0016162 A1* | 1/2011 | Booth et al. | 707/809 |
| 2011/0197254 A1 | 8/2011 | Sallaka et al. | |
| 2011/0277016 A1* | 11/2011 | Hockings et al. | 726/4 |
| 2011/0307957 A1* | 12/2011 | Barcelo et al. | 726/25 |

FOREIGN PATENT DOCUMENTS

WO   WO 2008/072250 A1 * 6/2008

* cited by examiner

*Primary Examiner* — Carl Colin
*Assistant Examiner* — Mohammad A Siddiqi
(74) *Attorney, Agent, or Firm* — Jeffrey S. LaBaw; David H. Judson

(57) ABSTRACT

A user provisioning system is extended to enable account reconciliation to occur in conjunction with a provisioning request. In response to a user provisioning request, a determination is made whether the user provisioning request is to be extended by including a reconciliation request. If so, the reconciliation request is piggy-backed on top of the provisioning request. This approach enables the reconciliation operation to be scoped to just the particular user account that is the subject to the provisioning operation, and it enables reconciliation to be carried out much more frequently as compared to the periodic, batch-oriented approach of prior techniques.

12 Claims, 3 Drawing Sheets

POLICY AND COMPLIANCE MANAGEMENT FOR USER PROVISIONING SYSTEMS

BACKGROUND OF THE INVENTION

1. Technical Field

This disclosure relates generally to security policy and compliance management for information technology (IT) systems.

2. Background of the Related Art

Information security is the process of providing a set of controls to manage risk with an end goal of demonstrating compliance with a set of regulations. Security policies specify how a set of controls operate and therefore to what extent risk may be capable of being managed.

Identity management (IdM) systems manage the life cycle of users and their accounts across a number of managed systems, such as directories, databases, operating systems and enterprise applications. Some IdM systems provide a mechanism for comparing the state of user accounts on managed systems and, in particular, comparing them to their last recorded state. This process, sometimes referred to as reconciliation, is used to enable policy-based user provisioning and compliance checking.

Known implementations for reconciling identity information, such as exist in commercial products such as IBM® Tivoli® Identity Manager™, usually involve reading a large set of user account data from a managed system and sending the data set to the IdM server periodically. In a typical example, such as where the managed system is Microsoft® Active Directory™, the IdM may be configured to retrieve all account information, say, every day, or every week. This retrieval process causes a significant degradation in the performance of the Information Technology (IT) system whose accounts are being managed by that directory. This problem leads organizations to schedule reconciliations less frequently than often is necessary or desirable, thus increasing the risk of undetected security violations such as unauthorized entitlements or access.

Therefore, there is a need in the art to enhance reconciliation mechanisms to allow non-compliant accounts to be detected at the earliest possible opportunity. The subject matter of this disclosure addresses this need.

BRIEF SUMMARY

The deficiencies in prior art reconciliation approaches are addressed by "extending" a typical provisioning operation with a reconciliation request. In particular, when a user provisioning operation is requested, a determination is made whether the provisioning operation can be extended to include a reconciliation request (i.e. a request to perform reconciliation on the account that is the subject of the desired provisioning operation). If the provisioning operation can be extended in this manner, the reconciliation is carried out together with the provisioning operation. This approach enables the reconciliation operation to be scoped to just the particular user account that is the subject to the provisioning operation, and it enables reconciliation to be carried out much more frequently as compared to the batch-oriented approach of the prior art.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
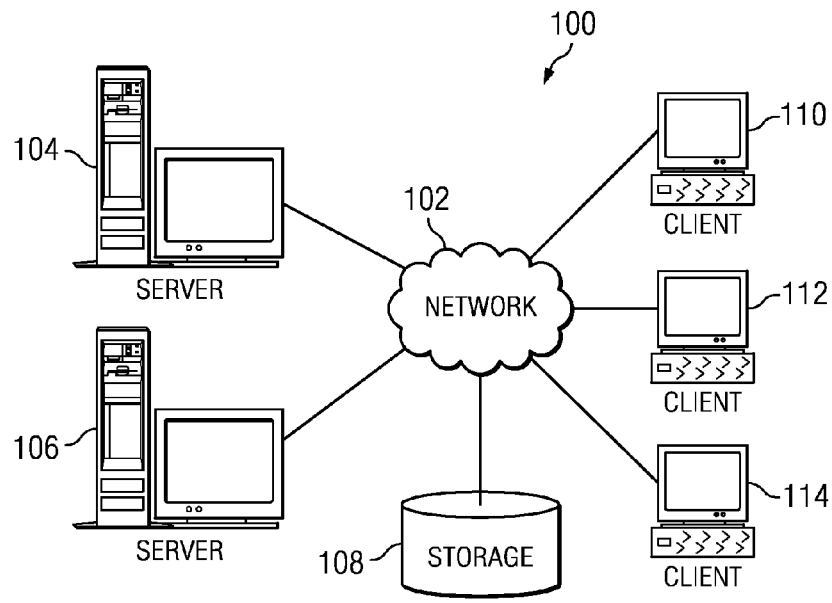
FIG. 1 depicts an exemplary block diagram of a distributed data processing environment in which exemplary aspects of the illustrative embodiments may be implemented.
Figure 2:
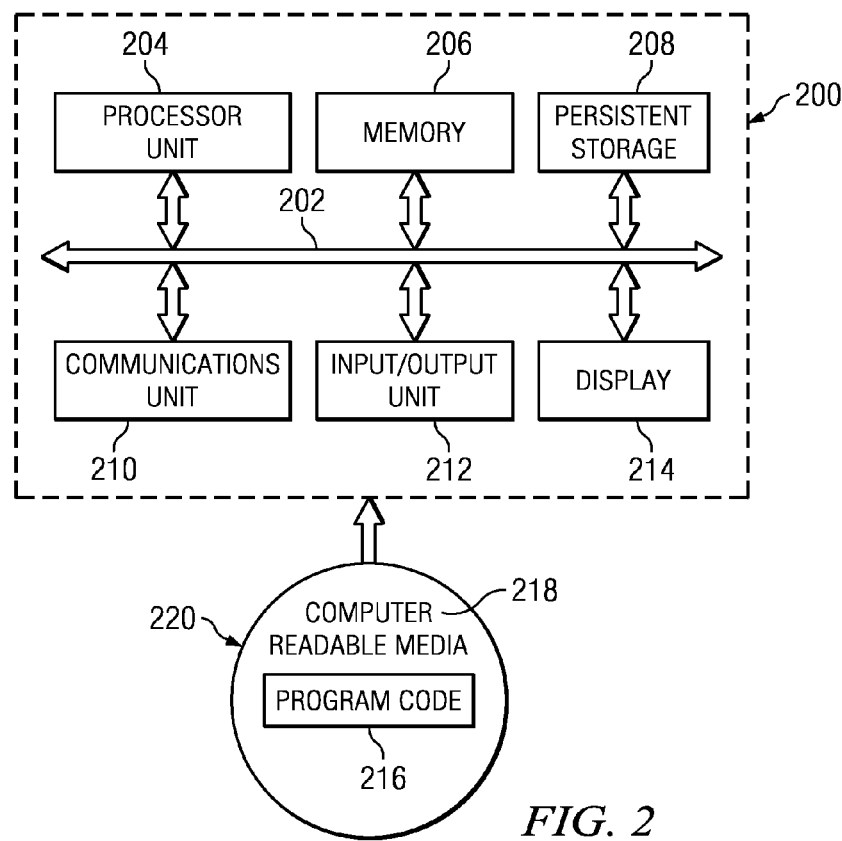
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C# or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

The process of creating user accounts and permissions for employees on a diverse array of computers can potentially consume much of an IT department's time and resources. Identity management (IdM) systems have been created to streamline the user provisioning process within an enterprise environment. Using this type of system, an administrator can build and implement applications that automatically create user accounts with appropriate permissions based, for example, on data entered into a human resources (HR) database. The resulting environment facilitates establishment and enforcement of authentication (such as single-sign on, or SSO) for newly-provisioned users. A known commercial product of this type is Tivoli® Identity Manager, available from IBM. Familiarity with such known identity management systems is presumed.

Figure 3:
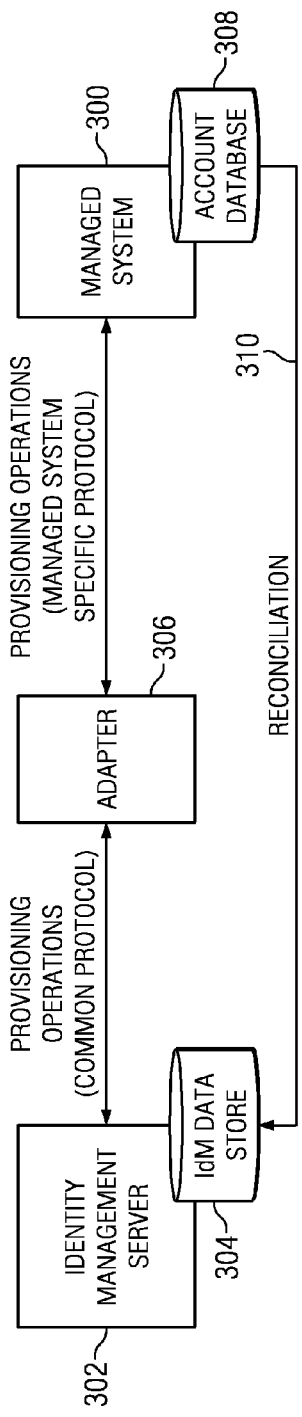
FIG. 3 illustrates a known reconciliation operation provided by an identity management system in association with a managed or "target" system.

As described above, "reconciliation" is a known mechanism by which Identity Management (IdM) systems compare state of user accounts on managed systems. In particular, reconciliation is the process of synchronizing accounts between the IdM and the managed systems, and (as necessary) applying one or more adoption rules configured for the reconciliation. FIG. 3 illustrates this known process. In this example scenario, a managed system 300 (which may also be referred to as a "target system" or "managed endpoint") may be of any type, such as a directory, a database, an operating system, an enterprise application, or the like. Users (or, more generally, user accounts) are provisioned to use the managed system using well-known user provisioning mechanisms, such as referenced above. As shown in the drawing, an identity management (IdM) server 302 having an IdM data store 304 is used to provide and manage the user provisioning operation. To facilitate the provisioning operation, a system of this type typically includes an adapter agent (or "adapter") 306. The adapter agent typically is implemented as a lightweight application that runs on or in association with a managed endpoint 300. The adapter 306 provides the identity management server 302 with the capability to manage the target system. In particular, such agents typically are used for provisioning, de-provisioning, and modification of the user accounts on the managed endpoint. In the known system of FIG. 3, the identity management server 302 interacts with the adapter 306 to perform one or more user/account provisioning operations over a common protocol, and the adapter 306 interacts with the managed system 300 to implement the provisioning operation, typically over a managed system-specific protocol. The managed system 300 has an associated account database 308 that includes the account information being managed (for all user accounts, or for some defined subset thereof). Periodically, and as indicated by arrow 310, the information in the account database 308 is read by the identity management server 302 and then compared with information in the IdM data store 304. This is the known reconciliation process. During this (in effect) batch-oriented reconciliation, the IdM server 302 determines whether particular user accounts are compliant with one or more policies and, if not, applies one or more adoption rules configured for the reconciliation to attempt to address any non-compliance.

Improved Policy and Compliance Management for User Provisioning Systems

The deficiencies in prior art reconciliation approaches are addressed by "extending" a typical provisioning operation with a reconciliation request. In particular, when a user provisioning operation is requested, a determining is made whether the provisioning operation can be extended to include a reconciliation request (i.e. a request to perform reconciliation on the account that is the subject of the desired provisioning operation). If the provisioning operation can be extended in this manner, the reconciliation is carried out together with the provisioning operation. This approach enables the reconciliation operation to be fine-tuned (scoped) to just the particular user account that is the subject to the provisioning operation, and it enables reconciliation to be carried out much more frequently as compared to the batch-oriented approach of the prior art.

Figure 4:
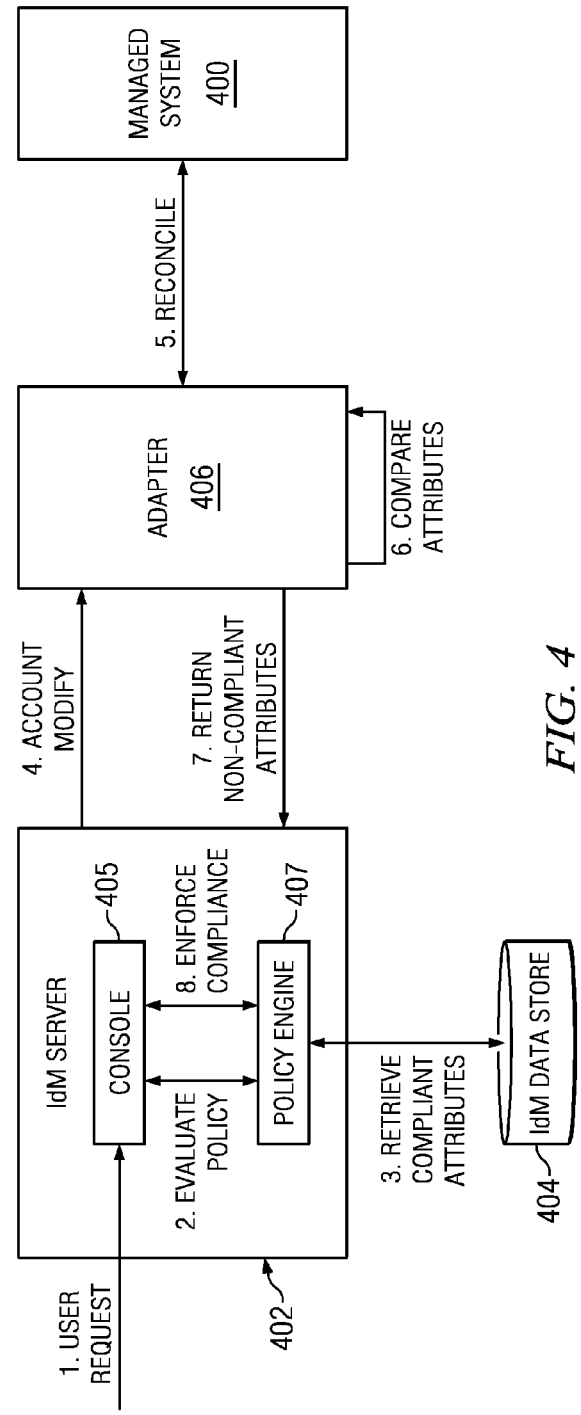
FIG. 4 illustrates a first embodiment of this disclosure wherein a reconciliation operation is piggy-backed onto a provisioning operation.

FIG. 4 illustrates the basic operation. In this embodiment, the basic components are the same as in the FIG. 3 approach, although the operations are different as will be described. Thus, there is a managed system 400, and an identity management (IdM) server 402 that has an associated IdM data store 404. An adapter 406 is installed on or otherwise associated with the managed system 400 to act as a proxy for the user provisioning operation. The IdM server 402 typically also includes a management console 405, and a policy engine 407 for implementing one or more user provisioning policies. A "policy" may refer to a single policy, or a set of policies. In this context, the policy engine 407 may be a standalone component, or it may comprise a component of a policy management system (not shown), which is also well-known in the art. A policy management system typically comprises a policy administration point (PAP), a policy decision point (PDP), and a policy enforcement point (PEP). The policy administration point is used to define a policy, which typically uses subject attributes provided from a user repository, as well runtime and environment data received from other sources.

The policy decision point responds to a policy query received from a policy enforcement point (PEP) to enforce the policy on a subject and with respect to a particular action initiated by the subject. A commercial implementation of such a system is IBM® Tivoli® Security Policy Manager.

As noted above, according to this disclosure, reconciliation occurs in conjunction with (or, more generally, in association with) a user provisioning request. More colloquially, the reconciliation request may be thought of as being "piggy-backed" on top of the provisioning request. FIG. 4 illustrates the process. The operation begins at step 1 when the user provisioning operation is initiated, either interactively by an administrator, programmatically from another system, or by some other means or mechanism already supported by the IdM server 402. Typical user provisioning operations include, without limitation, modify account, change password, and the like. A determination is then made regarding whether the provisioning operation can be extended (or "augmented") with a reconciliation request. This determination may be based on an administrator configuration (e.g., that certain types of provisioning requests are associated with reconciliation, while others may not be), or performed dynamically based on a configured rule or policy. This determination may also be optional, e.g., in the event that it is desired to have each provisioning operation associated with a reconciliation operation. Assume now that it is desired to extend the provisioning operation with the reconciliation request. Thus, at step 2, the provisioning policy or policies configured in the IdM server 402 are analyzed to determine the account attributes requires for compliance checking. At step 3, these attributes and their corresponding values are retrieved from the IdM data store 404. For example, if the managed system is an LDAP directory, an employee in a manager role must have a particular attribute (i.e. 'is Manager') that must have a corresponding value (e.g., set to 'Y') before the provisioning operation can proceed according to the policy. In the alternative, and to increase efficiency, the attributes and their corresponding values may be obtained from a cache. At step 4, the provisioning operation is formatted and sent to the adapter 406, preferably via an existing protocol supported by the IdM server 402 and the adapter 406. During this formatting, the expected values of the attributes are placed in the provisioning request. At step 5, the adapter retrieves from the managed system 400 the current values of the attributes identified in the provisioning request. At step 6, the retrieved attribute values are compared with the expected values sent in the provisioning request from the IdM server 402. If, as a result of the comparison at step 6, there are any inconsistencies, then preferably the provisioning operation fails and the current values for the account's attributes are returned to the IdM server 402. This is step 7. In most cases, aborting the provisioning operation is preferred because granting additional access to the already non-compliant account may pose a security risk. In the alternative, the provisioning operation may be allowed to complete despite the inconsistency based on a new configuration item in the IdM server or adapter. In the event of a failed provisioning operation, the IdM server's existing compliance policies are then used to determine the appropriate response from the IdM server. This is step 8. For example, the IdM server may mark the account as non-compliant, send a notification to an administrator, suspend the account, delete the account, or the like.

Thus, as compared to an existing provisioning operation, the technique shown in FIG. 4 adds several steps. In particular, step 3 is carried out to retrieve the account attributes and their values. Further, at step 4, the normal provisional operation is supplemented by including the retrieved attribute values so that the adapter can perform the comparison at step 6. In this manner, the reconciliation is piggy-backed onto the user provisioning operation.

Figure 5:
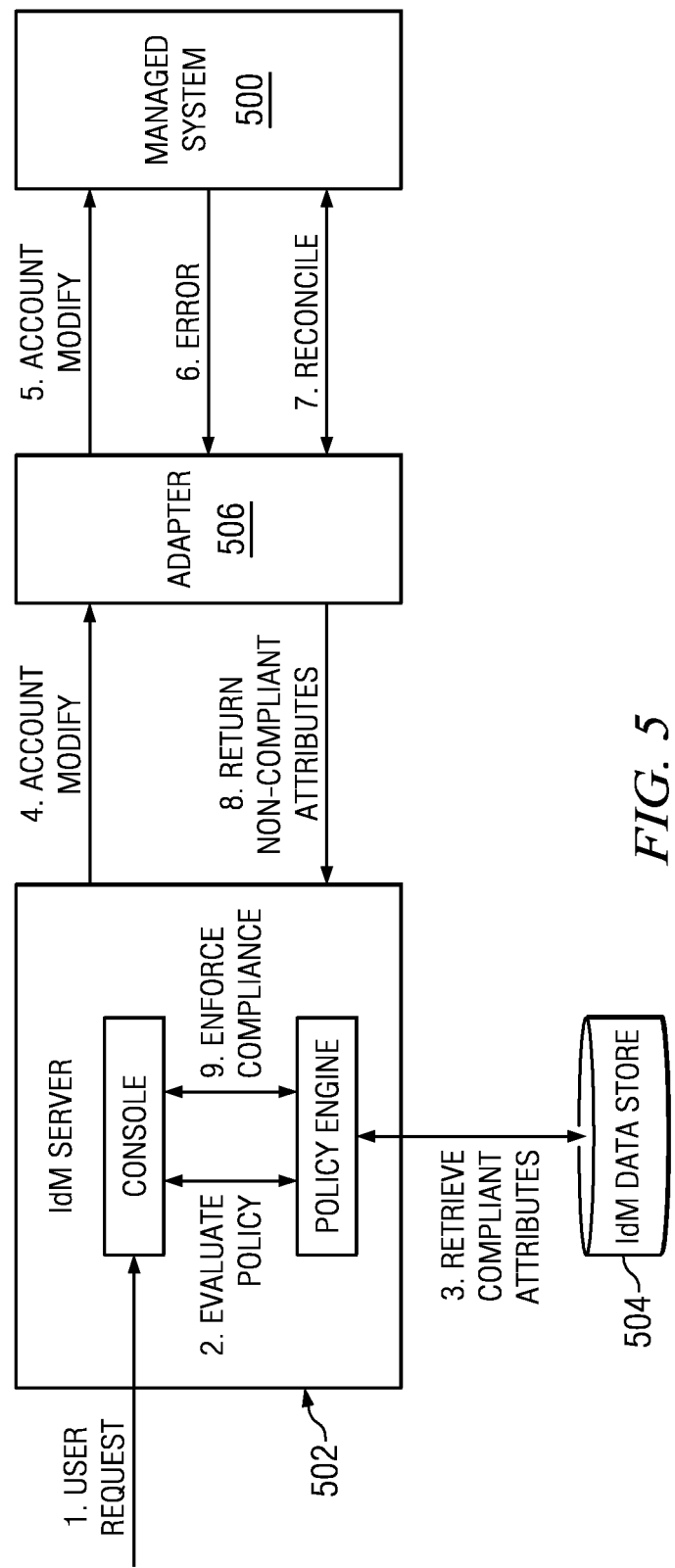
FIG. 5 illustrates a second embodiment of this disclosure wherein the reconciliation operation is carried out only upon detection of an error during a user provisioning operation.

FIG. 5 illustrates an alternative embodiment, once again involving the basic components, identified as managed system 500, IdM server 502, IdM data store 504, and adapter 506. In this embodiment, the piggy-backed reconciliation operation is only performed if there are inconsistencies detected during the user provisioning operation (such as an "account modify" operation). For example, assume the IdM server 502 sends an account modification request to the adapter 506 with a list of changes to multi-valued attributes. These changes may be represented as: a list of attribute values to add, a list of attribute values to remove, or the like. If the adapter attempts to remove a value for an attribute but the value does not exist, then it is possible that the account has changed without the knowledge of the IdM server. In this case, and according to the alternative embodiment, the account is marked as non-compliant and the non-compliant attribute values are returned and recorded in the IdM server. FIG. 5 illustrates the process.

The operation begins at step 1 when the user provisioning operation, in this case, an "account modify," is initiated. At step 2, the account modification provisioning policy is analyzed to determine the account attributes. At step 3, these attributes and their corresponding values are retrieved from the IdM data store 504 (or otherwise from local cache). At step 4, the account modify provisioning operation is formatted and sent to the adapter 506. At step 5, adapter initiates the account modify operation on the managed system 500. If the operation fails (e.g., because the adapter attempts to remove a value for an attribute but the value does not exist), the managed system returns an "error" to the adapter, and this error message includes the non-compliant attributes. This is step 6. According to the alternative embodiment, reconciliation is then attempted. Thus, at step 7 the adapter performs the reconciliation (e.g., by comparing the attribute values provided by the managed system with the expected values sent in the provisioning request). If, as a result of the comparison at step 7, there are any inconsistencies, then preferably the provisioning operation fails and the non-compliant values for the account's attributes are returned to the IdM server 502. This is step 8. In the event of a failed provisioning operation, the IdM server's existing compliance policies are then used to determine the appropriate response from the IdM server. This is step 9. As described above, the IdM server may mark the account as non-compliant, send a notification to an administrator, suspend the account, delete the account, or the like.

Thus, and as the above-described, non-limiting embodiments illustrate, reconciliation may be performed irrespective of whether or not the provisioning fails, only when the provisioning operation fails, or other variants.

Policy and compliance management for user provisioning system according to this disclosure provides significant advantages. A primary advantage is that, by using the described approach, non-compliant accounts are detected at the earliest opportunity (or, at the very least, much earlier than in the prior art), rather than always waiting for infrequently run reconciliations. Because the approach is leveraged off (i.e. takes advantage) of an existing provisioning operation, the approach consumes minimal system resources and still provides an effective complement to existing reconciliation mechanisms. The result is a lower cost reconciliation approach, as only a specific account or resource related to the provisioning operation is reconciled as opposed to all accounts at once (which occur in normal reconciliation). By scoping the reconciliation to just a particular user/account (or perhaps a subset of a larger number of users/accounts), fewer system resources are consumed but there is more frequent reconciliation on average, as many user provisioning operations (such as "password change") naturally are performed quite regularly. As described, the approach ensures earlier detection of non-compliant accounts, thereby significantly increasing compliance and the opportunity for effective remediation where necessary. In addition, the approach can be implemented with minimal changes to existing protocols and interfaces.

The described technique provides for a novel way of determining one or more attributes relating to a provisioning policy and reconciling these attributes for the purpose of compliance checking.

Although it is preferred that a particular reconciliation is scoped to a particular user/account, depending on performance considerations, the reconciliation request may be associated with a somewhat larger number of users/accounts. An example of such a partial reconciliation might be all users within a same group as the initial user in the provisioning request, a set of defined groups, a portion of the account database but only after a known exclusion list of groups are filtered out, and the like. In this alternative approach, there is a workload trade-off that must be balanced to ensure that performance of provisioning operations (which are typically expected to complete relatively quickly) are not adversely impacted.

Without limitation, the identity management (IdM) system and associated adapter that implement the piggy-backed reconciliation functionality described herein may be carried out on any type of computing entity, for example, in a data processing system such as illustrated in FIG. 2, as a client-server based computing system such as illustrated in FIG. 1, or in any other manner. Another alternative implements the reconciliation approach as a cloud-based service (in a cloud-computing environment). Yet another alternative is a standalone software system. The reconciliation function may be a component of a system other than an identity management system such as, without limitation, a security policy management system, a protected system, or any other system. The reconciliation function (alone, or on top of the user provisioning operation) may be implemented as a product, a service, a machine, a set of machines, one or more servers, one or more processes, one or more programs, or the like. The system typically includes management interfaces (such as a web-based graphical user interface (GUI), a command line interface (CLI), or the like) for administration, configuration and management. The reconciliation system may be implemented in a middleware appliance. In one embodiment, the system operates in a web-based computing environment and is accessible over a network, such as a private network, the public Internet, or the like. The system may operate within a computing environment, or across multiple environments.

One or more of such components (or "functions") may be combined with one another, and the nomenclature used here is merely intended for exemplary purposes. Thus, the adapter need not be agent of the managed system. One adapter may be shared by multiple managed systems. Each such component typically is implemented in software, as a set of computer program instructions, executable on one or more processors, to comprise a special-purpose computing entity or machine. In the alternative, a particular component is implemented as a machine, device, system, process, program or execution thread. A component typically includes or has associated therewith one or more data sets. Such components and data typically are stored in computer memory or one or more data stores.

Policy and compliance management for user provisioning system according to this disclosure provides significant advantages. A primary advantage is that, by using the described approach, non-compliant accounts are detected at the earliest opportunity (or, at the very least, much earlier than in the prior art), rather than always waiting for infrequently run reconciliations. Because the approach is leveraged off (i.e. takes advantage) of an existing provisioning operation, the approach consumes minimal system resources and still provides an effective complement to existing reconciliation mechanisms. The result is a lower cost reconciliation approach, as only a specific account or resource related to the provisioning operation is reconciled as opposed to all accounts at once (which occur in normal reconciliation). By scoping the reconciliation to just a particular user/account, fewer system resources are consumed but there is more frequent reconciliation on average, as many user provisioning operations (such as "password change") naturally are performed quite regularly. As described, the approach ensures earlier detection of non-compliant accounts, thereby significantly increasing compliance and the opportunity for effective remediation where necessary. In addition, the approach can be implemented with minimal changes to existing protocols and interfaces.

The particular techniques may be used in conjunction with any identity management function to facilitate any type of policy and compliance management including, without limitation, management of a security policy, an access policy, a data loss prevention policy, an identity provisioning policy, a web access control policy, and the like.

As previously noted, the functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The reconciliation functionality described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the described functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item that is non-transitory.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, an identity management (IdM) or user provisioning system or one or more of its component sub-systems exhibiting the above-described reconciliation functionality are implemented a special purpose computer, preferably in software executed by one or more processors. The software is maintained in one or more data stores or memories associated with the one or more processors, and the software may be implemented as one or more computer programs. Collectively, this special-purpose hardware and software comprises or supplements an existing policy management solution, an existing identity management solution, an existing user provision system, or some combination thereof, as has been described.

In a representative embodiment, an identity management (IdM) or user provisioning system central management console exposes one or more web-based interfaces that may be used to manage or configure the described functionality in the manner described.

As noted, the described reconciliation functionality may be implemented as an adjunct or extension to an existing policy management solution, incident management system, protected system, or the like.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Any application or functionality described herein may be implemented as native code, by providing hooks into another application, by facilitating use of the mechanism as a plug-in, by linking to the mechanism, and the like.

As noted, the above-described reconciliation function may be used in any system, device, portal, site, or the like wherein it is desired to reconcile identity information for policy and compliance management.

The disclosed technique is not limited to any particular type of user provisioning operation, such as provisioning new users.

Having described our invention, what we now claim is as follows.

The invention claimed is:

1. Apparatus, comprising:
a processor;
computer memory holding computer program instructions that when executed by the processor perform a method for compliance management in a user provisioning system, the method comprising:
in association with a provisioning operation for a target system, determining whether the provisioning operation is to be augmented with a reconciliation request;
when the provisioning operation is to be augmented with the reconciliation request, obtaining expected values of one or more identity attributes required to evaluate the reconciliation request;
associating the reconciliation request with the provisioning operation by including, in a provisioning request directed to the target system, the expected values of the one or more identity attributes required to evaluate the reconciliation request; and
performing a reconciliation in association with the provisioning operation by determining when the expected values of the one or more identity attributes match current values of the one or more identity attributes.

2. The apparatus as described in claim 1 wherein the method further includes analyzing a result of the provisioning operation to determine whether the provisioning operation fails.

3. The apparatus as described in claim 2 wherein the reconciliation is performed when the provisioning operation fails.

4. The apparatus as described in claim 1 wherein the reconciliation is performed irrespective of a completion status of the provisioning operation.

5. The apparatus as described in claim 1 wherein the provisioning operation is associated with a single user account and the performing step reconciles just the single user account.

6. The apparatus as described in claim 2 wherein the method further includes applying a compliance policy to generate a response to a failure of the provisioning operation.

7. A computer program product in a non-transitory computer readable medium for policy change management in a data processing system, the computer program product holding computer program instructions which, when executed by the data processing system, perform a method for compliance management in a user provisioning system, the method comprising:
in association with a provisioning operation for a target system, determining whether the provisioning operation is to be augmented with a reconciliation request;

when the provisioning operation is to be augmented with the reconciliation request, obtaining expected values of one or more identity attributes required to evaluate the reconciliation request;

associating the reconciliation request with the provisioning operation by including, in a provisioning request directed to the target system, the expected values of the one or more identity attributes required to evaluate the reconciliation request; and performing a reconciliation in association with the provisioning operation by determining when the expected values of the one or more identity attributes match current values of the one or more identity attributes.

8. The computer program product as described in claim 7 wherein the method further includes analyzing a result of the provisioning operation to determine whether the provisioning operation fails.

9. The computer program product as described in claim 8 wherein the reconciliation is performed when the provisioning operation fails.

10. The computer program product as described in claim 7 wherein the reconciliation is performed irrespective of a completion status of the provisioning operation.

11. The computer program product as described in claim 7 wherein the provisioning operation is associated with a single user account and the performing step reconciles just the single user account.

12. The computer program product as described in claim 8 wherein the method further includes applying a compliance policy to generate a response to a failure of the provisioning operation.

* * * * *